United States Patent [19]
Matsumoto et al.

[11] 3,808,725
[45] May 7, 1974

[54] FISHING NET HAVING A LARGE SPECIFIC GRAVITY

[75] Inventors: Akio Matsumoto; Kenji Someno, both of Tokyo, Japan

[73] Assignee: Mitsui Mining & Smelting Co., Ltd., Tokyo, Japan

[22] Filed: Aug. 2, 1972

[21] Appl. No.: 277,375

[30] Foreign Application Priority Data
 Aug. 3, 1971 Japan.............................. 46-57947

[52] U.S. Cl...................................... 43/7, 43/44.98
[51] Int. Cl............................................. A01k 73/00
[58] Field of Search......................... 43/7, 44.98, 14

[56] References Cited
UNITED STATES PATENTS

| 2,894,366 | 7/1959 | Leckie .................... 43/7 X |
| 3,451,305 | 6/1969 | Christensen et al. ......... 43/44.98 X |
| 3,334,436 | 8/1967 | Cole, Jr. ............................. 43/44.98 |
| 3,153,297 | 10/1964 | Grabowsky ............................ 43/7 |
| 2,590,586 | 3/1952 | Thompson, Jr. et al. .......... 43/7 UX |

FOREIGN PATENTS OR APPLICATIONS

| 724,598 | 2/1955 | Great Britain ..................... 43/44.98 |
| 86,202 | 9/1958 | Denmark .......................... 43/44.98 |

*Primary Examiner*—James H. Czerwonky
*Attorney, Agent, or Firm*—Woodhams, Blanchard and Flynn

[57] ABSTRACT

A fishing net having a high specific gravity prepared by netting monofilaments of a hollow thermoplastic synthetic resin sheath containing spaced-apart fiber segments of a metal or a metal alloy. The segments have a high specific gravity, such as in lead or lead alloys, and are enclosed therein as the core, or twines of such monofilaments. Voids are located within the sheath between adjacent ends of the segments. The net may also comprise compound twines consisting of the foregoing monofilaments and monofilaments of natural or chemical fibers.

8 Claims, 2 Drawing Figures

FISHING NET HAVING A LARGE SPECIFIC GRAVITY

BACKGROUND OF THE INVENTION a. Field of the Invention

The present invention relates to a fishing net with a high specific gravity, which is manufactured by netting the monofilaments of a synthetic resin having a core consisting of metallic fibers segments having a high specific gravity.

b. Description of the Prior Art

It is desired that a fishing net, such as a set net which is supposed to hold its shape by virtue of its own weight when submerged, should resist changes in its shape in spite of the tidal current, or to have a small resistance to the tidal current. And, a fishing net intended to be used to rapidly surround a school of fishes in the water, such as a round haul net, is required to have a high sinkability. The conventional fishing nets of these kinds are generally made of twines consisting of natural or chemical fibers. The resistance to the tidal current and the sinking speed of a fishing net are influenced by the kind, the thickness and the surface smoothness of the twines employed, the size of the mesh of the net fabric, the way it is knotted, etc., but, as is well known, the most important factor is the specific gravity of the net fabric, that is, the higher is said specific gravity, the better is the result.

In the prior art, it has been proposed to utilize twines of polyvinylidene chloride fibers having a high specific gravity or compound twines consisting of metallic fibers having a high specific gravity such as lead filaments, iron filaments, etc., and polyethylene fibers or polyamide fibers for the purpose of minimizing the resistance of the net to the tidal current and enhancing the sinking speed. However, inasmuch as the specific gravity of said polyvinylidene chloride fiber is about 1.7, and granting that this much specific gravity may suffice for certain types of fishing nets, not only is it naturally impossible to use it for making a fishing net that requires a higher specific gravity, but also it is considerably difficult to make it into a fishing net having a specific gravity less than that of said fiber. As for said compound twine consisting of the metallic fiber and the synthetic fiber, inasmuch as the metallic fiber is poor in flexibility and anti-corrosion property as compared with the synthetic fiber, it is not fully satisfactory for use as the material of fishing nets.

BRIEF DESCRIPTION OF THE DRAWINGS

In the appended drawings.

SUMMARY OF THE INVENTION

The object of the present invention is to provide a fishing net which is free of the aforementioned defects the conventional fishing nets and which possesses of a high specific gravity.

The present invention provides a fishing net having a high specific gravity, which is prepared by netting monofilaments of thermoplastic synthetic resin containing enclosed therein fiber segments of a metal or an alloy having a high specific gravity (of more than 6) such as lead or lead alloys as the core (hereinafter briefly referred to as "monofilaments of composite fiber"), or twines composed of these monofilaments, or compound twines composed of these monofilaments and monofilaments of natural or synthetic fiber.

The thermoplastic synthetic resins appropriate for use in the present invention include, for example, polyethylene, polypropylene, polyamide, polyvinylidene chloride, polyester, etc. The natural or chemical fibers applicable to the present invention includes all of those fibers popular for use in making conventional fishing nets, that is, in addition to the foregoing thermoplastic synthetic resins, such fibers as cotton, hemp, etc. are applicable, provided that these fibers are preferably of the same quality and almost the same diameter as those of the synthetic resin constituting said monofilaments of composite fiber. The diameters of the composite filaments are similar to those of conventional filaments used for fishing nets.

As the metal or alloy for use in the present invention, lead and alloys composed of lead and at least one member selected from the group consisting of As, Sb, Sn and Bi are preferable from the viewpoint of practical use, but Bi, Bi alloys, Sn and Sn alloys are also applicable.

Figure 1:
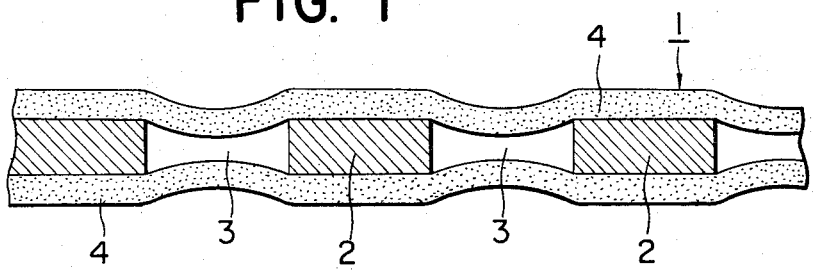
FIG. 1 is a longitudinal cross-section of a monofilament of composite fiber for use in the fishing net according to the present invention.

The monofilaments of composite fiber for use in the present invention are prepared, for instance, by the process comprising the steps: flowing a melt of a metal or a metal alloy having a melting point lower than the extruding temperature of said resin through a nozzle disposed inside a spinneret of a melt-spinning machine for the resin. The resin is simultaneously extruded around the metal in such a fashion that said molten metal is enclosed as a continuous core inside a continuous sheath of said resin. This extruded product is then drawn at a draw ration which is less than the elongation percentage at break of the resin and more than the elongation percentage at break of the metal alloy (cf. Japanese Patent Application No. 26323/1971) whereby the metal core is broken into discontinuous segments while the resin sheath remains continuous. The resulting monofilament has a structure as shown in FIG. 1 of the appended drawings: that is, the metal fiber segments 2 are enclosed in the center of a continuous synthetic resin sheath 4, with voids 3 being formed between said chopped metal fiber segments. The formation of these voids 3 is caused by the foregoing drawing step because the resin sheath is elongated without breaking whereas the metal core is broken into discontinuous segments by employing the draw ratio described above. The numeral reference 1 in the drawings denotes the entire monofilament of composite fiber.

A fishing net according to the present invention may be prepared by employing the foregoing monofilaments independently, but it is usually prepared by employing either twines obtained by twisting a plurality of these monofilaments or compound twines obtained by twisting this monofilament or monofilaments together with monofilament or monofilaments of natural or chemical fiber.

The thickness of the monofilament of the composite fiber, the twine and the compound twine for use in the present invention is sufficient if it is the same as that used to make conventional fishing nets.

Figure 2:
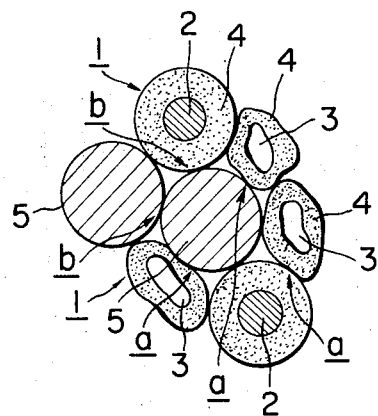
FIG. 2 is a transverse cross-section of a compound twine consisting essentially of this monofilament.

FIG. 2 is a cross-sectional view of a compound twine prepared by employing the monofilaments shown in FIG. 1. The numeral reference 5 in FIG. 2 denotes a natural or synthetic fiber, a denotes the contact zones between (A) the surfaces of the void portions 3 of the monofilaments 1 of composite fiber and (B) the surfaces of the portions filled with the metallic fiber pieces 2 of the monofilaments of composite fiber and the surfaces of the natural or synthetic fiber 5, b denotes the contact zones between (A) the surfaces of the portions filled with metallic fiber pieces 2 of the monofilaments of composite fiber and (B) the surfaces of the natural or synthetic fiber 5 as well as the contact zones between the surfaces of the fellow natural or synthetic fibers 5. As will be understood from this drawing, the area of the contact zones a is larger than the area of the contact zones b. Therefore, the twine according to the present invention has the advantage that scarcely any slippage of the yarn occurs unlike the conventional twine consisting merely of natural or synthetic fiber (wherein the state of the contact zones are all as indicated by b).

The monofilament of composite fiber according to the present invention contains discontinuous metallic fiber segments 2 in its center enclosed in a resin sheath 4, so that it possesses sufficient flexibility. Consequently, it is quite easy to twine like monofilaments of this kind or this monofilament or monofilaments and other monofilament or monofilaments of natural or synthetic fiber. The thus prepared twines or these monofilaments by themselves can be melted in the same ways as ordinary natural or synthetic fibers. Therefore, the fishing net according to the present invention can be produced by the same process of twining and netting as is employed in manufacturing fishing nets consisting of natural or synthetic fibers. The specific gravity appropriate for the fishing nets of the present invention is not particularly limited, but, preferably, it is in the range of about 1.3 to 3.5 from the viewpoint of practical use.

The fishing net according to the present invention has the following advantages and is therefore useful as a set net, round haul net and the like.

1. Because of the employment of monofilaments containing discontinuous metallic fiber segments having a large specific gravity, the fishing net possesses a high specific gravity; and it is easy to make it to have a selectable specific gravity according to the intended use by compound twining employing the composite fiber and natural or synthetic fibers.

2. It can be provided with abrasion resistance, corrosion resistance and other properties according to the intended use by qualitative selection of the synthetic resin to be employed for the monofilament of composite fiber.

3. It is free of slippage of the yarn and distortion of mesh, and the filaments of its knots is satisfactory.

Hereunder will be given some examples embodying the present invention.

PREFERRED EMBODIMENTS OF THE INVENTION

EXAMPLE 1

A melt of an alloy consisting of 50 wt. percent of Bi, 25 wt. percent Pb, 12.5 wt. percent of Sn and 12.5 wt. percent of Cd was flowed out through the inner nozzle of a double-nozzled spinneret, and at the same time, molten nylon was extruded through the outer nozzle of the same spinneret so as to coat the alloy with said nylon, whereby a monofilament containing a metal core enclosed in a sheath of nylon was prepared. Subsequently, by drawing this monofilament to the extent of four times its initial length said metal core was broken into segments. A monofilament of 0.3 mm diameter and a specific gravity of 2.9 was obtained.

The thus obtained monofilaments were twisted together with 400-denier polyethylene monofilaments at the ratio of one ply of the former to 20 plies of the latter, and a pair of the resulting strands were further twisted together, whereby a twine of 3 mm diameter was obtained.

Next, by netting these twines into a knotless net fabric, a fishing net having a specific gravity of 1.4 was obtained. The specific gravity of the fishing net in the present example is remarkably large as compared with the specific gravity of 0.9 in the case of a knotless fishing net made of polyethylene monofilaments alone.

EXAMPLE 2

Subsequent to preparing monofilaments composed of Pb alloy containing 8 wt. percent of Sb as the core and polypropylene coated thereon in the same way as in Example 1, by drawing these monofilaments to a length of five times the initial length, monofilaments of 0.28 mm diameter and a specific gravity of 2 were obtained. Next, the thus obtained monofilaments were made into a 20 ply strand, and a pair of the resulting strands were further twisted together, whereby a twine was prepared. Then, by netting these twines into a knotless net fabric, a fishing net was prepared.

When this fishing net was compared with a comparative fishing net which was made by netting twines obtained by twisting a couple of strands together, which strand had been prepared by aligning 22 plies of the conventional 1,000-denier polyvinylidene chloride monofilament, the result was as shown in the following table.

|  | specific gravity | loop strength of twine |
|---|---|---|
| fishing net of the present invention | 1.95 | 39.8 Kg |
| comparative fishing net | 1.60 | 38.4 Kg |

EXAMPLE 3

Subsequent to preparing monofilaments composed of 99.99 percent purity lead as the core and polypropylene coated thereon in the same way as in Example 1, by drawing these monofilaments to a length of 4.3 times the initial length, monofilaments of 0.25 mm diameter and a specific gravity of 2.5 were obtained. Next, the thus obtained monofilaments were twisted together with 400-denier polypropylene at the ratio of 16 plies of the former to 10 plies of the latter, and a pair of the resulting strands were further twisted together, whereby a twine of 2 mm diameter was obtained. Then, by netting these twines into a knotless net fabric, a fishing net having a specific gravity of 1.9 was obtained. The specific gravity of this fishing net is obviously larger than the specific gravity of 1.6 in the case of a fishing net made solely of polyvinylidene chloride monofilaments.

The embodiments of the invention in which an exclusive property or privledge is claimed are defined as follows:

1. A fishnet comprising a plurality of filaments forming a net, the filaments comprising essentially a continuous synthetic thermoplastic hollow resin sheath having a central core of discontinuous, spaced-apart, imperforate segments of metal or metal alloy having a specific gravity of more than 6, said core segments being encased within and tightly contacted by said continuous synthetic thermoplastic hollow resin sheath, with there being voids within said sheath between adjacent ends of said core segments.

2. A fishnet according to claim 1, in which said net consists essentially of said filaments which are netted together to form the net.

3. A fishnet according to claim 1, in which said filaments are twined together to form twines and the twines are netted together to form the net.

4. A fishnet according to claim 1, in which said filaments are twined together with natural or synthetic fibers to form twines and the twines are netted together to form the net.

5. A fishnet according to claim 4, wherein the diameter of said filaments is substantially equal to the diameter of said fibers.

6. A fishnet according to claim 4, wherein the synthetic resin constituting said filaments and the synthetic fibers are the same resin.

7. A fishnet according to claim 1, wherein said metal or metal alloy is at least one member selected from the group consisting of lead, lead alloys, tin, tin alloys, bismuth and bismuth alloys.

8. A fishnet according to claim 1, wherein said thermoplastic resin is selected from the group consisting of polyethylene, polypropylene, polyamide, polyvinylidene chloride and polyester.

* * * * *